(12) United States Patent
Sekita (10) Patent No.: US 12,538,936 B2
(45) Date of Patent: Feb. 3, 2026

(54) WATERLESS ICE CRYSTAL NUCLEATOR WITH CONVEX ULTRASONIC TRANSMITTER

(71) Applicant: THE COCA-COLA COMPANY, Atlanta, GA (US)

(72) Inventor: Miyako Sekita, Tokyo (JP)

(73) Assignee: THE COCA-COLA COMPANY, Atlanta, GA (US)

( * ) Notice: Subject to any disclaimer, the term of this patent is extended or adjusted under 35 U.S.C. 154(b) by 989 days.

(21) Appl. No.: 17/600,205

(22) PCT Filed: Apr. 2, 2019

(86) PCT No.: PCT/US2019/025286
§ 371 (c)(1),
(2) Date: Sep. 30, 2021

(87) PCT Pub. No.: WO2020/204909
PCT Pub. Date: Oct. 8, 2020

(65) Prior Publication Data
US 2022/0192236 A1    Jun. 23, 2022

(51) Int. Cl.
*A23L 5/30*        (2016.01)
*A23G 9/04*        (2006.01)

(52) U.S. Cl.
CPC .............. *A23L 5/32* (2016.08); *A23G 9/045* (2013.01)

(58) Field of Classification Search
CPC ... A23L 5/32; A23L 2/00; A23L 3/005; A23L 3/32; A23V 2002/00; B67D 1/0857; F25D 31/00; F25D 31/007; B60P 3/0257
(Continued)

(56) References Cited

U.S. PATENT DOCUMENTS 5,880,359 A     3/1999  Kondo et al.
6,238,371 B1 *  5/2001  Himbert ................ A61M 5/326
                                                604/263
(Continued)

FOREIGN PATENT DOCUMENTS

AU      2011236097 A1    11/2011
CN       205205118 U      5/2016
(Continued)

OTHER PUBLICATIONS

Sonic Hour https://blog.fromjapan.co.jp/en/japanese-culture/japanese-beer-glasses-ultrasonic-beer-foamers-for-the-home-bartender.html pp. 1 and 15-16 (Year: 2017).*

(Continued)

*Primary Examiner* — Vy T Nguyen
(74) *Attorney, Agent, or Firm* — Meunier Carlin & Curfman LLC (57)    ABSTRACT

A beverage nucleator system for a supercooled beverage container may include a frame for receiving a beverage container and an ultrasonic transmitter positioned therein. A convex protrusion from the ultrasonic transmitter ensures good contact and therefore good transfer of ultrasonic energy through a top surface of a closure of the beverage container, even if the beverage container is positioned within the frame at an angle to the ultrasonic transmitter. Alternatively or additionally, a packaging holder comprising a plurality of supports may be provided to ensure that the top surface of the closure is parallel with the ultrasonic transmitter.

19 Claims, 4 Drawing Sheets

(58) Field of Classification Search
USPC .................. 137/170.1, 170.3; 62/538; 99/451
See application file for complete search history.

(56) References Cited

U.S. PATENT DOCUMENTS

| | | | |
|---|---|---|---|
| 6,686,195 | B1 | 2/2004 | Colin et al. |
| 10,149,487 | B2 | 12/2018 | Shuntich |
| 2004/0026600 | A1 | 2/2004 | Horen |
| 2005/0258711 | A1 | 11/2005 | Funakubo |
| 2007/0080609 | A1* | 4/2007 | Johnson ................ B06B 1/0618 310/323.04 |
| 2007/0209520 | A1 | 9/2007 | Ho et al. |
| 2011/0308264 | A1 | 12/2011 | Youn et al. |
| 2013/0074602 | A1 | 3/2013 | Jackson |
| 2014/0113035 | A1 | 4/2014 | Bartkowska et al. |
| 2015/0030729 | A1 | 1/2015 | Hopkins |
| 2015/0233631 | A1 | 8/2015 | Shuntich |
| 2015/0264968 | A1 | 9/2015 | Shuntich |
| 2016/0081373 | A1* | 3/2016 | Coyne ...................... A23B 2/57 99/451 |

FOREIGN PATENT DOCUMENTS

| | | | |
|---|---|---|---|
| CN | 106288648 | A | 1/2017 |
| EP | 1078038 | | 7/2003 |
| EP | 1466966 | A1 | 10/2004 |
| JP | H05115846 | A | 5/1993 |
| JP | H06233560 | A | 8/1994 |
| JP | H07337047 | A | 12/1995 |
| JP | 2005000058 | A | 1/2005 |
| JP | 2005318869 | | 11/2005 |
| JP | 2005333749 | A | 12/2005 |
| JP | 2014150727 | A | 8/2014 |
| KR | 10-2008-0088944 | | 10/2008 |
| KR | 20080088943 | | 10/2008 |
| KR | 10-2010-0018887 | | 2/2010 |
| WO | 2005120243 | A1 | 12/2005 |
| WO | 2015188068 | A1 | 12/2015 |
| WO | 2018160594 | A1 | 9/2018 |

OTHER PUBLICATIONS

Sonic Hour https://web.archive.org/web/20150426215018/https://www.takaratomy-arts.co.jp/specials/beerhour/sonichourportable.html (Year: 2015).*
Zheng, CN 208085554 (Year: 2018).*
Shinagawa, WO 2020026679 (Year: 2020).*
Examination Report No. 1 issued in Australian Application No. 2018227711, mailed Feb. 8, 2023.
Notice of Allowance issued in U.S. Appl. No. 16/489,427, mailed Feb. 23, 2023.
English translation of Japanese Office Action issued in Japanese Application No. 2021-0559030, mailed Mar. 20, 2023.
English translation of Chinese Office Action issued in CN 2019800970418, mailed Jan. 6, 2024.
Office Action issued in Canadian Application No. 3, 135,822, mailed Feb. 9, 2024.
Office Action issued in Canadian Application No. 3,054,739, mailed Feb. 22, 2024.
English Translation of Notice of Reasons for Rejection issued in JP 2019-546397, mailed Aug. 3, 2021.
G. Hayward, "Through transmission ultrasonic NDT without coupling fluids," IEE Colloquium on Non-Contacting and Remote NDT, London, UK, 1992, pp. 6/1-6/2. (Year: 1992).
Supplementary European Search Report for European Application No. 18761855.8 dated Nov. 30, 2020.
Written Opinion for Singapore Application No. 11201907888U dated Dec. 1, 2020.
Search Report for Singapore Application No. 11201907888U dated Dec. 1, 2020.
International Search Report and Written Opinion issued by the International Searching Authority (ISA/KR) in application No. PCT/US2018/020021 on Jun. 7, 2018. 16 pages.
International Preliminary Report on Patentability issued by the International Bureau of WIPO in application No. PCT/ US2018/ 020021 on Sep. 12, 2019. 10 pages.
Office Action issued for U.S. Appl. No. 16/489,427, dated Apr. 2, 2021.
Office Action issued for U.S. Appl. No. 16/489,427, dated Nov. 1, 2021.
Written Opinion for Singapore Application No. 11201907888U, dated Feb. 21, 2022.
English summary of Chinese Office Action issued in CN 2018800222319, mailed May 23, 2022.
English translation of Korean Office Action issued in KR Application No. 10-2019-7027449, mailed Sep. 15, 2023.
Communication pursuant to Article 94.3 issued in EP18761855.8, mailed Mar. 23, 2023.
English translation of Office Action issued in MX/a/2019/010184, mailed May 4, 2023.
Extended European Search Report issued in EP 19922932.9, mailed Sep. 16, 2022.
English Summary of Office Action issued in CN2018800222319, mailed Sep. 27, 2022.
Deting Tan, Automatic Detection Technology, China Railway Publishing House, Aug. 2008, 1st edition, 1st printing, p. 69, English Machine Translation.
Tiezhi Zhang, Mechanical and Electrical Technology of Traffic Civil Engineering, Metallurgical Industry Press, Apr. 2013, 1st edition, 1st printing, pp. 60-61, English Machine Translation.
English translation of Notice of Decision to Grant issued in JP 2021-559030, mailed Aug. 15, 2023.
English translation of Notice of Allowance issued in KR10-2019-7027449, mailed May 17, 2024.
Non-Final Office Action issued in U.S. Appl. No. 16/489,427, mailed Apr. 14, 2022.
English translation of Japanese Office Action issued in related JP Application No. 2019-546397, mailed Mar. 31, 2022.
International Search Report and Written Opinion issued in International Application No. PCT/US2019/025286, mailed Jan. 2, 2020, 9 pages.
English translation of Office Action issued in KR10-2021-7035433, mailed Jul. 31, 2024.
Office Action issued in CA 3135822, mailed Sep. 9, 2024.

* cited by examiner

WATERLESS ICE CRYSTAL NUCLEATOR WITH CONVEX ULTRASONIC TRANSMITTER

CROSS REFERENCE TO RELATED APPLICATION

This application is a national phase entry under 35 U.S.C. § 371 of International Application No. PCT/US2019/025286, filed on Apr. 2, 2019, which is hereby incorporated by reference herein in its entirety.

TECHNICAL FIELD

The present application and the resultant patent relate generally to supercooled beverages and more particularly relate to a waterless ice crystal nucleator system for supercooled beverages to initiate ice crystal nucleation in conventional beverage bottles, cans, and other containers.

BACKGROUND OF THE INVENTION

Generally described, supercooled beverages are increasingly popular. Specifically, supercooled beverages may be cooled to a temperature below freezing such that ice crystals may form after the container holding the beverage is opened or after energy is otherwise imparted to the beverage so as to initiate nucleation of the ice crystals. Conventional carbonated soft drinks may contain sufficient energy therein upon the opening of the container and the initial release of carbon dioxide to initiate ice crystal nucleation. Non-carbonated beverages such as waters, dairy-based beverages, sports drinks, coffees, teas, and the like, however, may require additional energy to initiate ice crystal nucleation therein.

One method of providing additional energy to initiate ice crystal nucleation has been with the use of ultrasonic energy. Know ultrasonic methods, however, generally use a fluid bath as the ultrasonic transmitting material between the beverage container and the ultrasonic transmitter. Although the use of the fluid bath may be an effective transmission medium, repeated use of such fluids in a commercial setting and the like may be problematic due to spills, dripping, and other types of potential issues. The operator has to frequently clean and refill the fluid bath. Moreover, failure to do so may result in an unsatisfactory appearance to a consumer.

SUMMARY OF THE INVENTION

In a first aspect of the disclosure, the present application and the resultant patent provide a beverage nucleator system for a supercooled beverage container. The beverage nucleator system may include an ultrasonic device with an ultrasonic transmitter. The beverage nucleator system may also include a frame with the ultrasonic device positioned therein. The frame configured to position a closure of the container in contact with a first surface of the ultrasonic transmitter. The first surface of the ultrasonic transmitter comprises a convex surface.

In some implementations of the first aspect of the disclosure, the convex surface is positioned in a central location of the first surface.

In some implementations of the first aspect of the disclosure, the convex surface is positioned at a center of the first surface.

In some implementations of the first aspect of the disclosure, the convex surface is a separate component that is affixed to the first surface.

In some implementations of the first aspect of the disclosure, the first surface and the convex surface are different materials.

In some implementations of the first aspect of the disclosure, the convex surface is a polymer.

In some implementations of the first aspect of the disclosure, the beverage nucleator system may also include a front cover coupled to the frame. The frame comprises a support surface with an apex positioned apart from the front cover. The beverage nucleator system may also include a plurality of supports positioned along the support surface between the front cover and the apex.

In some implementations of the first aspect of the disclosure, the plurality of supports comprise a first support positioned along the support surface on a first side of the apex and a second support positioned along the support surface on a second side of the apex.

In some implementations of the first aspect of the disclosure, the plurality of supports are formed of a compliant material.

In some implementations of the first aspect of the disclosure, the compliant material is a foam or elastomer.

In some implementations of the first aspect of the disclosure, the frame is configured to position a closure of the container in contact with the first surface of the ultrasonic transmitter with the container in an inverted position.

In some implementations of the first aspect of the disclosure, the ultrasonic transmitter is configured to provide an ultrasound signal with a frequency between 5-60 kHz, with a power of 3-100 W, for an amount of time between 100 ms-30 s.

In a second aspect of the disclosure, a method of providing an iced beverage product comprises receiving a supercooled beverage in a bottle with a closure such that the closure of the bottle is in direct contact with a first surface of an ultrasonic transmitter. The first surface of the ultrasonic transmitter comprises a convex surface. The method also includes transmitting ultrasonic energy from the convex surface of the ultrasonic transmitter into the beverage through the closure to cause ice crystal nucleation within the beverage.

In some implementations of the second aspect of the disclosure, the convex surface is positioned in a central location of the first surface.

In some implementations of the second aspect of the disclosure, the convex surface is a separate component that is affixed to the first surface.

In some implementations of the second aspect of the disclosure, the first surface and the convex surface are different materials.

In some implementations of the second aspect of the disclosure, receiving the bottle comprises positioning the closure in an inverted position in a frame that has the ultrasonic transmitter positioned therein.

In some implementations of the second aspect of the disclosure, the frame comprises a support surface with a plurality of supports positioned along the support surface.

In some implementations of the second aspect of the disclosure, the plurality of supports are formed of a compliant material.

In some implementations of the second aspect of the disclosure, the ultrasonic energy comprises a frequency between 5-60 kHz, with a power of 3-100 W, for an amount of time between 100 ms-30 s.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Generally, in a beverage liquid that is cooled below its freezing point ice crystals can be formed by providing physical stimulation. Some types of physical stimulation that have been used include an impact pressure applied by dropping or striking a beverage container against a surface or a sudden drop of internal pressure caused by releasing gas from a carbonated beverage during the opening of a beverage closure. However, relying on a drop in pressure limits the physical stimulation to only products with a sufficient amount of carbonation or other internal gas pressure. Also, relying on an impact pressure raises the risk of damage to the product.

While there are several types of physical stimulation that may be used to initiate nucleation of ice crystals in a super cooled liquid, described herein is a use of ultrasonic stimulation. Specifically, described herein is a system and method for transferring ultrasonic energy to a beverage liquid. With the ultrasonic device of the pending disclosure, an icy beverage may be formed from a beverage that is super cooled and provide an improved consumer experience. Such ultrasonic stimulation enables almost all beverage products to be supercooled and have consistent ice crystal formation.

Generally, when using an ultrasonic device, water or other fluid is used as a transmission medium for transmitting the ultrasonic energy between an ultrasound generator and a contact area of beverage product. Such a fluid transmission medium maximizes the ultrasonic conveyance and level of crystallization. However, use of water causes hygiene concerns for beverage products or troublesome and logistical concerns for operation of a shop.

It has been discovered that ice crystal nucleation can be consistently initiated via direct application of ultrasound to a closure of a supercooled beverage container. The closure is used as the contact point for ultrasonic transmission because the top surface of the closure is more rigid than other parts of a package like the body of a bottle. Using the rigid top surface of the closure enables ensures that the least loss of ultrasonic transmission will occur. However, when the top surface of the closure is not oriented parallel to the surface of an ultrasonic transmitter, substantial loss of ultrasonic transmission may occur at the junction of the closure and the threads of a package. This loss of ultrasonic transmission caused by the package being at an angle to the ultrasonic transmitter may in turn cause insufficient ultrasonic energy transfer to the supercooled beverage to successfully initiate ice crystal nucleation. Therefore, good contact between the ultrasonic transmitter and the top surface of the enclosure enables more effective and reliable ultrasonic energy transfer to the beverage liquid.

Accordingly, a convex protrusion from the ultrasonic transmitter is provided herein to ensure good contact and therefore good transfer of ultrasonic energy through the top surface of the closure, even if a package is positioned at an angle to the ultrasonic transmitter. Alternatively or additionally, a packaging holder comprising a plurality of supports may be provided to ensure that the top surface of the closure is parallel with the ultrasonic transmitter.

More successful crystallization of super cooled beverages may be more reliably provided with the improved contact between the ultrasonic transducer and the top surface of the closure. Additionally, a wider variety of product package body diameters, with still (non-carbonated) and carbonated beverages are accommodated by the waterless ultrasonic device of the pending disclosure.

With the improvements disclosed herein, a broader range of super cooling temperatures may be used with success for each product SKU (stock keeping unit). Therefore, a more flexible selection of SKU combinations may be sold within the same cooler equipment with same temperature setting. For example, a beverage SKU can be sold at both −4 and −5° C. and successfully initiate ice nucleation using the waterless nucleator of the pending disclosure, whereas the same SKU may have previously only been sold only at −5° C. to ensure successful nucleation. In prior implementations, the beverage SKU may have only been sold in a cooler with other SKUs that have successful nucleation temperatures at −5° C., whereas with the pending waterless nucleator, the SKU can be sold in the same cooler with other −5° C. SKUs, as well as SKUs with different optimal nucleation temperatures, such as −4° C. SKUs.

The waterless ultrasonic device enables more stable and reliable contact between an ultrasonic transducer and the top surface of the closure to accommodate the diverse conditions of actual operation of the waterless ultrasonic device by consumers. Therefore, the ultrasonic transfer to beverage liquid becomes more efficient and reliable, which can deliver more successful crystallization of super chilled beverage.

Figure 1:
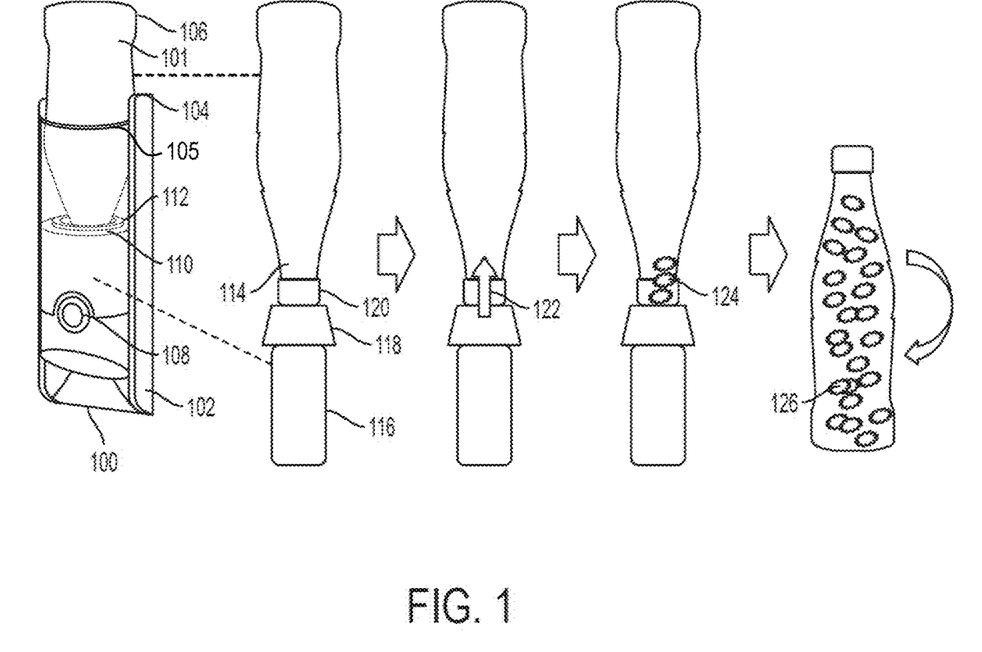
FIG. 1 is a perspective view and operation sequence of a waterless ice crystal nucleator system for a supercool beverage as may be described herein.

Referring now to the drawings, in which like numerals refer to like elements throughout the several views, FIG. 1 shows an example of a waterless ice crystal nucleator system 100 for a supercool beverage as may be described herein. While described herein as a supercooled beverage, any such fluid or flowable material may be used herein, such as for carbonated beverages, non-carbonated beverages, sodas, teas, coffee, water, milk, smoothies, drinkable yogurt, or other flowable food products with a slurry, suspension, heterogeneous, or homogeneous mixture of solids and liquids.

The waterless ice crystal nucleator system 100 may be used with any type of beverage 101 or other consumable flowable product, including both carbonated and non-carbonated products, within any type of conventional container 106 such as bottles, cans, and the like. The beverage container 106 may be made out of glass, metals, thermoplastics, or other types of materials. The beverage container 106 may be enclosed by a conventional closure 120. The closure 120 may be made out of metals, thermoplastics, or other types of materials. The closure 120 may include a cap, crown, tab, or any other type of closure. The closure 120 is opened by a consumer to gain access to the beverage 101 contained within the beverage container 106.

Generally described, the beverage container 106 is maintained within a conventional cooler, vendor, vending machine, or the like at a uniform supercooled temperature. The supercooled temperature is below a freezing point of the beverage 101, but above a temperature at which homogeneous nucleation of the beverage 101 occurs. Once removed from the cooler or other equipment, the beverage container 106 may be placed in the waterless ice crystal nucleator system 100 to initiate nucleation of ice crystals in the beverage 101.

The waterless ice crystal nucleator system 100 includes a frame 102 with an opening 104 sized to receive the beverage container 106. A front cover 105 is coupled to the frame 102 to support the beverage container 106 in the frame 102. For example, the front cover 105 ensures that the beverage container 106 does not fall out of the front side of the frame 102. The frame 102 and front cover 105 may be made out of any suitable type of rigid materials such as thermoplastics, stainless steels, and the like. In various implementations, the front cover 105 is transparent or translucent to allow consumers to view the nucleation of ice crystals in the beverage container 106 while still supporting the beverage container 106 within the frame 102. The frame 102 may have any suitable size, shape, or configuration. Specifically, the frame 102 may be sized to allow an ultrasonic device 116 to be positioned and supported therein.

The waterless ice crystal nucleator system 100 also includes an upper ledge 110 coupled to the frame 102 with a beverage container aperture 112 positioned therein. The aperture 112 is sized to receive the closure 120 of the beverage contain 106. The aperture 112 may also be sized to receive a portion of a neck 114 of the beverage container 106 as well. The beverage container aperture 112 may be positioned about an ultrasound transmitter 118 of the ultrasonic device 116. The aperture 112 allows for the closure 120 of the beverage contain 106 to come into physical contact with the ultrasound transmitter 118. The beverage container aperture 112 may be sized to position and support the beverage container 106 therein in contact with the ultrasound transmitter 118.

In the example of FIG. 1, the opening 104 and the beverage container aperture 112 are sized to position and support the closure 120 of the beverage container 106 therein. The beverage container 106 is alternatively referred to as a bottle 106 in the example shown in FIG. 1. The beverage container aperture 112 may be adjustable and/or different ledges 110 with different sized beverage container apertures 112 may be used to accommodate beverage containers 106 of differing sizes and shapes. Other components and other configurations may be used herein.

In some implementations, the frame 102 may include a number of support arms positioned above a stepped cap guide (not shown). The support arms may be spring loaded to accommodate supporting different package sizes while the stepped cap guide may be spring loaded to accommodate different cap sizes. In use, as a beverage container 106 is lowered, the support arms rotate to adjust to the width of the container 106. That is the support arms rotate around and come in interference with the container 106 to support the container 106 within the frame 102. The weight of the container 106 then pushes the stepped cap guide downward such that the container 106 comes into contact with and is properly centered on the ultrasound transmitter 118. The ultrasonic device 116 then may be activated.

A user interface 108 is positioned on a front surface of the nucleator system 100. The user interface 108 may include one or more indicator lights or other displays that indicate the operational state of the nucleator system 100. The user interface 108 may also include one or more buttons or switches actuatable by a user to activate operation of the nucleator system 100. As shown in FIG. 1, the user interface 108 includes a button with a light ring surrounding the button. Pressing the button initiates operation of the nucleator system 100. Other types of initiation devices such as a switch and the like also may be used herein. The light ring may operate to flash, pulse, circle, and/or change color to indicate different operating states of the nucleator system 100.

The ultrasound transmitter 118 is coupled to the ultrasonic device 116 and configured to transmit ultrasound signals 122 generated by the ultrasonic device 116 to the closure 120 of the beverage container 106. The ultrasonic device 116 may be of conventional design and may have any suitable size, shape, configuration, or frequency range. In an example, the ultrasonic device 116 may be portable. An example of the ultrasonic device 116 is a bolt fastened 28 kHz Langevin transducer. Another example of the ultrasonic device 116 is the "Sonic Hour" ultrasonic transmitter sold by Takara Tomy Arts Company of Japan. Other types of ultrasonic devices and transmitters may be used herein.

The ultrasonic device 116 may be configured to provide an ultrasound signal with a frequency between 5-60 kHz, with a power of 3-100 W, for an amount of time between 100 ms-30 s, with a downward pressure between the closure 120 of beverage product 106 and the ultrasound transmitter 118 of 0-20 N, with a contact area between the closure 120 of beverage product 106 and the ultrasound transmitter 118 between 1-30 mm diameter. In some implementations, a frequency of 28 kHz is used with a power of 5-10 W, for 1-5 seconds, with 0 N of additional downward pressure (downward pressure is only applied by the weight of the product), on a contact area of 30 mm.

In use, the ultrasonic device 116 may be positioned within the frame 102. The beverage container 106 may be removed from a cooler or other type of supercooling refrigeration device and may be inserted into the waterless ice crystal nucleator system 100 in an inverted position. In the case of the use of the bottle 106 show in FIG. 1, the closure 120 of the bottle 106 may be inserted through the opening 104 and into the beverage container aperture 112. The beverage container aperture 112 may support the bottle 106 therein in contact with the ultrasound transmitter 118 of the ultrasonic device 116 at which point the ultrasonic device 116 is activated. For example, a button on the user interface 108 may be selected to activate the ultrasonic device 116. The ultrasonic device 116 thus produces ultrasonic energy 122 that is transmitted by the transmitter 118 through the closure 120 and into the beverage 101 within the beverage container 106.

The ice crystal nucleation process thus may begin with the formation of ice crystals 124 about the closure 120. The beverage container 106 need only remain within the waterless ice crystal nucleator system 100 for several seconds or so. Upon the removal of the beverage container 106 from the waterless nucleator system 100, a consumer may then orient the beverage container 106 in an upright position. Additional ice crystals 126 form as a result of propagation of the nucleation process through the beverage 101. A consumer then may enjoy the ice filled beverage.

The use of the bottle 106 in the inverted position within the waterless ice crystal supercooling beverage nucleator system 100 was found to promote superior ice crystal nucleation regardless of whether the beverage container 106 was made out of glass, metal, or thermoplastics. The use of the closure 120 positioned about the ultrasonic transmitter 118 may provide for the transfer of increased ultrasonic energy into the beverage 101 as compared to transmission from the sides, the bottom, or other areas of the beverage containers 20. Specifically, the use of the hard, flat, and relatively compact surface of the closure 120 may limit energy losses therethrough for improved ice crystal nucleation therein.

The waterless ice crystal nucleator system 100 thus promotes ice crystal nucleation in a supercooled beverage 101 without the use of a fluid bath as the ultrasonic transmission medium. Instead of transmitting the ultrasonic energy through a large area as in the fluid bath, the waterless ice crystal nucleator system 100 provides the ultrasonic energy via point contact for improved ice crystal nucleation in the supercooled beverage 101 without the issues surrounding the use of the fluid bath or other types of transmission mediums.

Figure 2A:
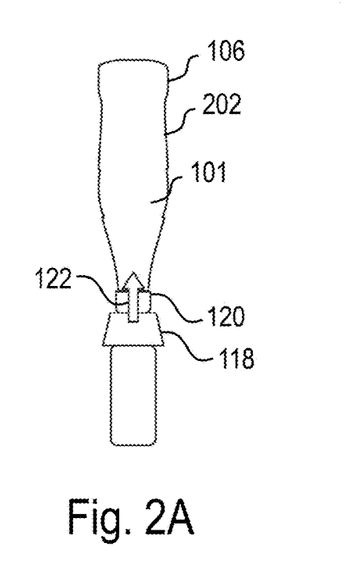
FIGS. 2A-2B are perspective views of two different orientations of a beverage container with respect to the waterless ice crystal nucleator system.

FIGS. 2A-2B are perspective views of two different orientations of a beverage container with respect to the waterless ice crystal nucleator system. As shown in FIG. 2A, the beverage container 106 is positioned in a first orientation 202 with respect to the ultrasound transmitter 118. In the first orientation 202, the top surface of the closure 120 is parallel to a top surface of the ultrasound transmitter 118. In other words, the top surface of the closure 120 is in contact with the ultrasound transmitter 118 in the first orientation 202. Accordingly, as described above, ultrasonic energy 122 is transmitted by the transmitter 118 through the closure 120 and into the beverage 101 within the beverage container 106, thereby initiating ice crystal nucleation with the formation of ice crystals 124 about the closure 120.

Figure 2B:
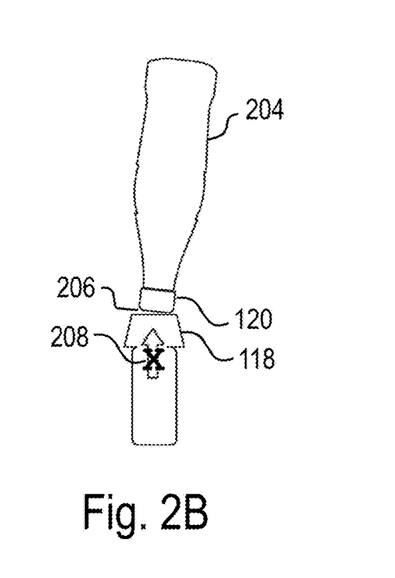

However, as shown in FIG. 2B, the beverage container is positioned in a second orientation 204 with respect to the ultrasound transmitter 118. In the second orientation 204, the beverage container 106 is leaning such that the top surface of the closure 120 is at an angle to the top surface of the ultrasound transmitter 118. In other words, the top surface of the closure 120 is not in contact with the ultrasound transmitter 118 in the second orientation 204. Rather an edge of the closure 120 is in contact with the ultrasound transmitter. Accordingly, a gap 206 forms between the ultrasound transmitter 118 and the top surface of the closure 120. Therefore, sufficient ultrasonic energy 208 generated by the ultrasonic device 116 is not able to be reliably transferred through the closure 120 to the beverage 101 to initiate ice crystal nucleation. The insufficient contact between the top surface of the closure 120 and the top surface of the ultrasound transmitter 118 also causes noise during operation of the ultrasound transmitter 118.

Insufficient contact between the top surface of the closure 120 and the top surface of the ultrasound transmitter 118 is more likely to occur with still (non-carbonated) beverages with less lean (a lower angle of lean relative to the top surface of the ultrasound transmitter 118) in the second orientation 204 as compared with carbonated beverages. The increased likelihood of losing sufficient contact for non-carbonated beverages is due to the relative flatness of the top surface of the closure 120. In contrast, for carbonated beverages, the top surface of the closure 120 may have a slight doming or convex extension away from the beverage container 106 due to increased internal pressures. With the doming of the top surface of the closure 120, carbonated beverages can maintain sufficient contact with the ultrasound transmitter 118 even with some lean. However, with the flat top surface of the closure 120 of non-carbonated beverages, even a little lean of the beverage container 106 relative to the ultrasound transmitter 118 will result in insufficient contact to initiate ice crystal nucleation.

Figure 3A:
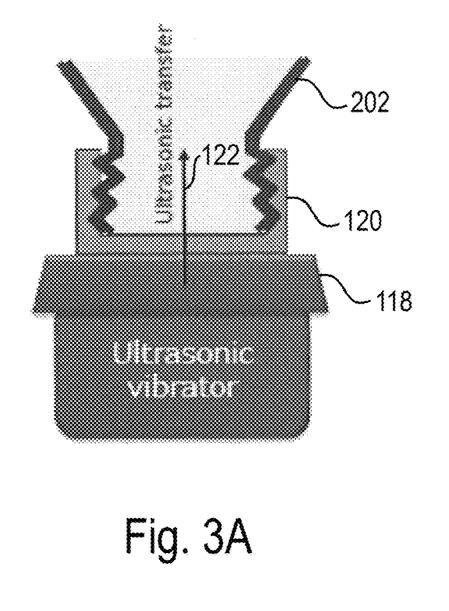
FIGS. 3A-3B show cross-sectional views of the beverage container at the two different orientations with respect to the waterless ice crystal nucleator system.
Figure 3B:
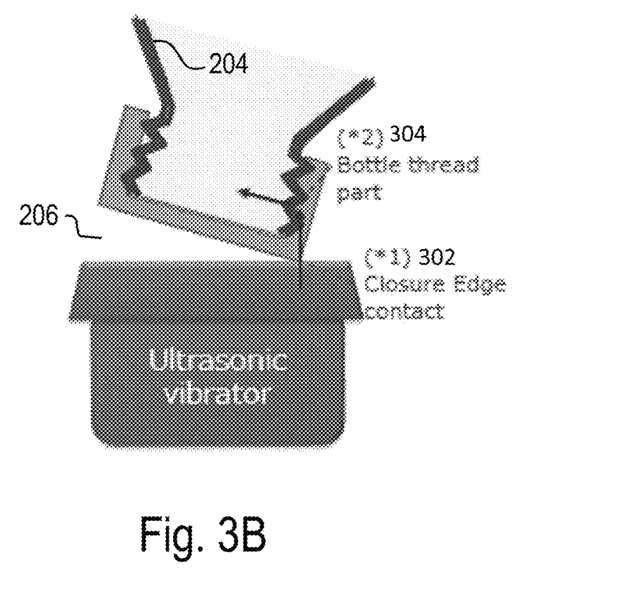

FIGS. 3A-3B show cross-sectional views of the beverage container 106 at the two different orientations 202, 204 with respect to the ultrasound transmitter 118 of the waterless ice crystal nucleator system 100. As shown in FIG. 3A, the beverage contain 106 is positioned in the first orientation 202. Accordingly, the top surface of the closure 120 is parallel to the top surface of the ultrasound transmitter 118 and the ultrasonic energy 122 is transmitted by the transmitter 118 through the closure 120 and into the beverage 101 within the beverage container 106, thereby initiating ice crystal nucleation.

However, as shown in FIG. 3B, the beverage contain 106 is positioned in the second orientation 204. Accordingly, the top surface of the closure 120 is separated from the top surface of the ultrasound transmitter 118 by a gap 206. Therefore, a sufficient amount the ultrasonic energy 122 is not transmitted by the transmitter 118 through the closure 120 and into the beverage 101 to initiate ice crystal nucleation. When the beverage container 106 is leaning in the second orientation 204, the ultrasonic energy 122 is instead transferred to the edge of the closure 120 that is in contact with the ultrasound transmitter 118, shown at 302. The ultrasonic energy transferred to the edge of the closure 120 in turn is transferred to the closure threads of the beverage container 106 at 304, and only then transferred to the beverage 101. Therefore, an insufficient amount of the ultrasonic energy is transferred to the beverage 101 to initiate ice crystal nucleation.

Figure 4:
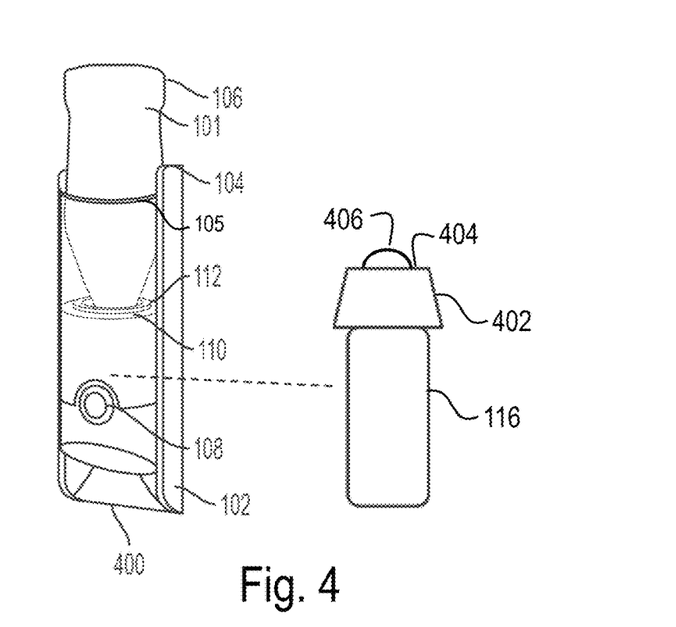
FIG. 4 is a waterless ice crystal nucleator system with an ultrasonic transmitter comprising a convex surface.

FIG. 4 is a waterless ice crystal nucleator system 400 with an ultrasonic transmitter 402 comprising a convex surface 406. The waterless ice crystal nucleator system 400 is substantially similar to the waterless ice crystal nucleator system 100 described above, where like numeral designate like parts. In order to ensure more reliable transfer of a sufficient amount of the ultrasonic energy 122 through the top surface of the closure 120 to initiate ice crystal nucleation, the ultrasonic transmitter 402 comprises a convex surface 406 positioned on a top surface 404 of the ultrasonic transmitter 402. In various implementations, the convex surface 406 is positioned in a central location of the top surface 404 of the ultrasonic transmitter 402. The convex surface 406 is positioned on the top surface 404 of the ultrasonic transmitter 402 within the aperture 112. In some implementations, the convex surface 406 is positioned at a center of the aperture 112 and/or the top surface 404 of the ultrasonic transmitter 402.

The convex surface 406 provides for a more reliable contact between the ultrasonic transmitter 402 and the top surface of the closure 120, even when the beverage 101 is a non-carbonated beverage and the beverage container 106 is leaning in the second orientation 204. Therefore, the waterless ice crystal nucleator system 400 enables more stable and reliable contact between the ultrasonic transmitter 402 and the top surface of the closure 120 and accommodates both non-carbonated and carbonated beverages in normal operation, even when the beverage container 106 has some lean. Additionally, the convex surface 406 reduces noise caused by insufficient contact between the ultrasonic transmitter 118 and the top surface of the closure 120.

While the convex surface 406 is depicted in FIG. 4 as a half circle, the convex surface 406 may have other geometries, geometric shapes, or irregular shapes. The convex surface 406 may have a smoot or regular surface, a patterned surface, or an irregular surface. The convex surface 406 may be integrally formed as part of the top surface 404 of the ultrasonic transmitter 402. The convex surface 406 may be a separate component that is the same or a different material as the ultrasonic transmitter 402 that is affixed to the top surface 404 of the ultrasonic transmitter 402. The convex surface 406 may be affixed to the top surface 404 of the ultrasonic transmitter 402 by adhering, gluing, welding, screwing, bolting, riveting or any other method of affixing two objects together.

Figure 5:
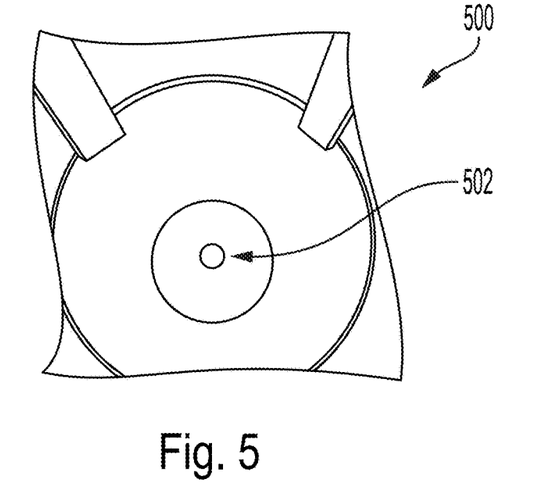
FIG. 5 is an embodiment of the waterless ice crystal nucleation system with a polymer coupled to the ultrasonic transmitter for forming the convex surface.

FIG. 5 is an embodiment of the waterless ice crystal nucleation system 500 with a polymer coupled to the ultrasonic transmitter for forming the convex surface 502. The waterless ice crystal nucleator system 500 is substantially similar to the waterless ice crystal nucleator system 400 described above. The top surface 404 of the ultrasonic transmitter 402 is a metallic surface and the convex surface 502 is a polymer. In various implementations, the polymer of the convex surface 502 is a hot-melt adhesive, such as ethylene-vinyl acetate (EVA), a polyolefin (PO), a polyamide (PA), a polyester, a thermoplastic polyurethane (TPU), a polyurethane (PUR), or the like. Other polymers may be used, such as polyvinyl chloride (PVC), high density polyethylene (HDPE), polyethylene terephthalate (PET), or the like. In various implementations, the polymer of the convex surface 502 may be substantially the same material as the closure 120.

Figure 6:
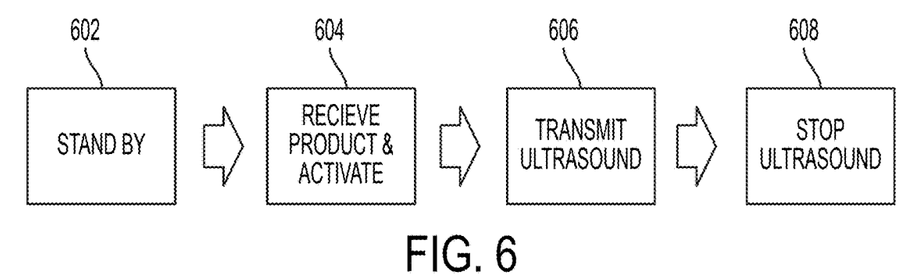
FIG. 6 is a flow chart of the operation of the waterless ice crystal nucleation system for a supercool beverage as may be described herein.

FIG. 6 is a flow chart of the operation of the waterless ice crystal nucleation system for a supercool beverage as may be described herein. The method of FIG. 6 may be used with any of the embodiments of the waterless ice crystal nucleation systems described herein. At 502, the waterless ice crystal nucleation system is in a standby state. At 504, a product is received through the opening 104 and a closure of the product is brought into physical contact with the ultrasound transmitter 118 through the aperture 112. The waterless ice crystal nucleation system is activated after receiving the product. For example, the waterless ice crystal nucleation system may be activated upon one or more of receiving a selection on an activation button in a user interface 108, upon detecting that a contact switch is closed, and/or upon detecting a threshold pressure by a pressure sensor. At 506, the ultrasonic device 116 activates to transmit ultrasonic energy to the ultrasound transmitter 118, which in turn transfers the ultrasonic energy to the top surface of the closure of the product. The rigid top surface of the closure of the product in turn transfers the ultrasonic energy to the beverage product contained therein. At 508, after a predetermined time period, the ultrasonic device 116 stops transmitting ultrasonic energy. For example, the predetermined time period may be between 1-3 seconds. In another example, the predetermined time period may be between 3-5 seconds.

Figure 7A:
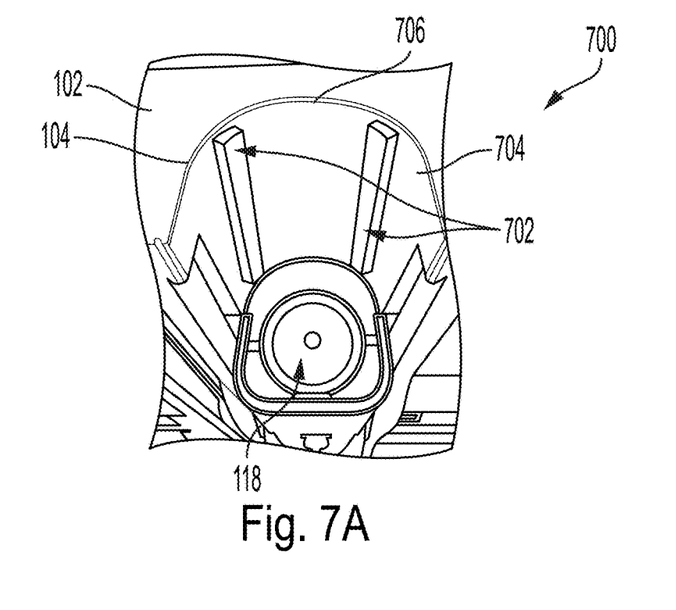
FIGS. 7A-7B show various views of a waterless ice crystal nucleator system with a packaging holder comprising a plurality of supports for ensuring a desired orientation of a package with respect to an ultrasonic transmitter.
Figure 7B:
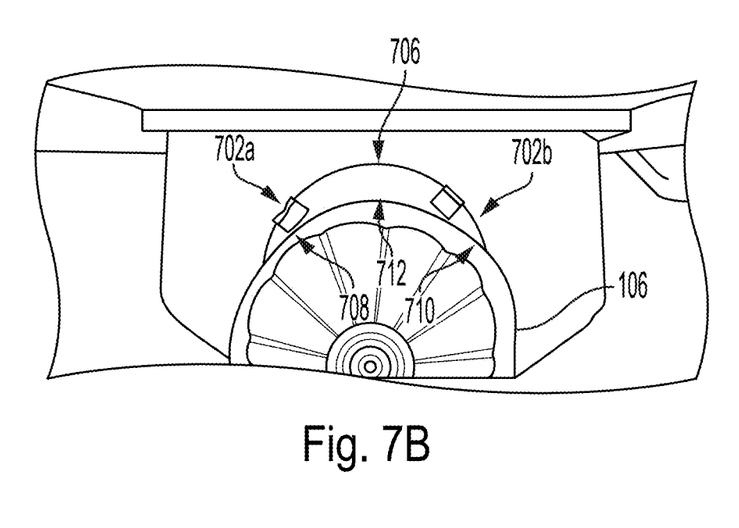

FIGS. 7A-7B show various views of a waterless ice crystal nucleator system 700 a plurality of supports 702 for ensuring a desired orientation of a package with respect to the ultrasonic transmitter 118. In some implementations, the plurality of supports 702 may also be used for either the waterless ice crystal nucleator systems 400,500 along with the convex surfaces 406, 502. For example, as shown in FIG. 5, the waterless ice crystal nucleator system 500 also includes a plurality of supports.

The plurality of supports 702 facilitate receiving the beverage container 106 through the opening 104 in the frame 102 and maintaining the beverage container 106 in a vertical orientation (e.g., the first orientation 202). As best shown in FIG. 7A, the frame 102 comprises a container support surface 704 upon which the plurality of supports 702 are located. As shown, the support surface 704 is a curved surface, though other geometries may be used, such as square, oval, or the like. The plurality of supports 702 are positioned along the support surface 704 between the front cover 105 and an apex 706 (e.g., farthest surface of the support surface 704 from the front cover 105) of the support surface 704.

The plurality of supports 702 may be formed of a compliant material, such as a foam or elastomeric material and affixed to the support surface 704 by any effective method. The compliant nature of the plurality of supports 702 facilitates accommodating a large variety of beverage containers 106 with different diameters, while still supporting the containers in a vertical orientation. While two supports are shown in FIGS. 7A and 7B, any number of supports may be used. Other variations are contemplated by this disclosure.

As shown in FIG. 7B, a first support 702a is positioned along the support surface 704 between the front cover 105 and a first side of the apex 706 and a second support 702b is positioned along the support surface 704 between the front cover 105 and a second side of the apex 706. The beverage container 106 contacts the first support 702a at a first contact point 708 and contacts the second support 702b at a second contact point 710. Accordingly, the beverage container 106 is prevented from coming into contact with the apex 706 of the support surface 704 and is maintained in the first orientation 202. In other words, the plurality of supports 702 (702a, 702b) maintain the beverage contained in the first orientation 202 despite there being a space 712 between the beverage container 106 and the support surface 704 by providing contact points with the plurality of supports 702.

The space 712 allows for accommodating a variety of packages of different diameters. However, without the plurality of supports, the space 712 provides a possibility for the beverage container 106 to lean an be situated in the second orientation 204. Accordingly, the plurality of supports 702 ensure that the beverage container 106 does not lean and therefore maintains the first orientation 202 for efficient transfer of ultrasonic energy to the beverage 101.

Figure 8:
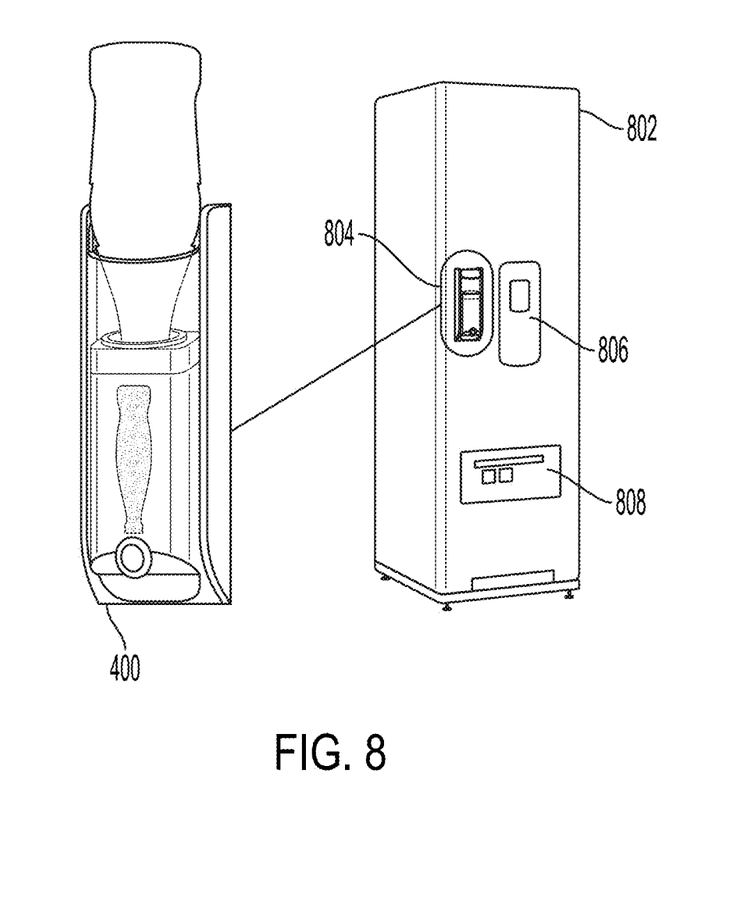
FIG. 8 is a perspective view of a product cooler with a waterless ice crystal nucleator system for a supercool beverage installed thereon.

FIG. 8 is a perspective view of a product cooler 802 with a waterless ice crystal nucleator system 400 for a supercool beverage installed thereon. While shown as embodied as the waterless ice crystal nucleator system 400 described above, the product cooler 802 may have installed any of the systems 400, 500, 700 or variations thereof. The product cooler 702 includes a user interface 706 to dispense a product from a temperature controlled chamber (not shown) to a product port 708. The product dispensed from the cooler 702 may be maintained at a supercooled temperature. The product may then be inserted by a consumer into the waterless ice crystal nucleator system 400 to create an iced beverage.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

What is claimed is:

1. A beverage nucleator system for a supercooled beverage container, comprising:
    a waterless ultrasonic device with an ultrasonic transmitter configured to transmit an ultrasonic signal;
    a frame with the waterless ultrasonic device positioned therein;
    a front cover coupled to the frame, wherein the frame comprises a support surface with an apex positioned apart from the front cover; and
    a plurality of supports positioned along the support surface between the front cover and the apex,
    wherein the frame is configured to position a closure of the container in direct contact with a first surface of the ultrasonic transmitter such that the ultrasonic signal is transmitted directly to the container unaltered to cause ice crystal nucleation of the supercooled beverage container, wherein the first surface of the ultrasonic transmitter comprises a convex surface,
    wherein the plurality of supports is positioned along the support surface such that the beverage container contacts only the plurality of supports and the convex surface on the first surface of the ultrasonic transmitter.

2. The beverage nucleator system of claim 1, wherein the convex surface is positioned in a central location of the first surface.

3. The beverage nucleator system of claim 2, wherein the convex surface is positioned at a center of the first surface.

4. The beverage nucleator system of claim 1, wherein the convex surface is a separate component that is affixed to the first surface.

5. The beverage nucleator system of claim 4, wherein the first surface and the convex surface are different materials.

6. The beverage nucleator system of claim 1, wherein the plurality of supports comprise a first support positioned along the support surface on a first side of the apex and a second support positioned along the support surface on a second side of the apex.

7. The beverage nucleator system of claim 1, wherein the plurality of supports are formed of a compliant material.

8. The beverage nucleator system of claim 7, wherein the compliant material is a foam or elastomer.

9. The beverage nucleator system of claim 1, wherein the frame is configured to position the closure of the container in contact with the first surface of the ultrasonic transmitter with the container in an inverted position.

10. The beverage nucleator system of claim 1, wherein the ultrasonic transmitter is configured to provide an ultrasound signal with a frequency between 5-60 kHz, with a power of 3-100 W, for an amount of time between 100 ms-30 s.

11. The beverage nucleator system of claim 1, wherein the ultrasonic transmitter does not require a liquid medium to transfer the ultrasonic energy to the beverage container.

12. The beverage nucleator system of claim 1, wherein the plurality of supports provides a radially inwardly directed force that biases the beverage container towards a vertical orientation.

13. A method of providing an iced beverage product, comprising:
    providing a waterless ultrasonic device positioned within a frame, wherein a front cover is coupled to the frame and the frame comprises a support surface with an apex positioned apart from the front cover, wherein a plurality of supports are positioned along the support surface between the front cover and the apex;
    receiving, in the frame, a supercooled beverage in a bottle with a closure such that the closure of the bottle is in direct contact with a first surface of an ultrasonic transmitter of the waterless ultrasonic device, wherein the first surface of the ultrasonic transmitter comprises a convex surface; and
    transmitting ultrasonic energy from the convex surface of the ultrasonic transmitter into the supercooled beverage directly through the closure unaltered to cause ice crystal nucleation within the beverage,
    wherein the plurality of supports is positioned along the support surface such that the bottle contacts only the plurality of supports and the convex surface on the first surface of the ultrasonic transmitter.

14. The method of claim 13, wherein the convex surface is positioned in a central location of the first surface.

15. The method of claim 14, wherein the convex surface is a separate component that is affixed to the first surface.

16. The method of claim 15, wherein the first surface and the convex surface are different materials.

17. The method of claim 15, wherein receiving the bottle comprises positioning the closure in an inverted position in the frame that has the ultrasonic transmitter positioned therein.

18. The method of claim 13, wherein the plurality of supports are formed of a compliant material.

19. The method of claim 13, wherein the ultrasonic energy comprises a frequency between 5-60 kHz, with a power of 3-100 W, for an amount of time between 100 ms-30 s.

* * * * *